United States Patent
Croasdale

(10) Patent No.: US 7,345,705 B2
(45) Date of Patent: Mar. 18, 2008

(54) PHOTONIC BUOY

(75) Inventor: William Croasdale, Wakefield, RI (US)

(73) Assignee: Raytheon Company, Waltham, MA (US)

( * ) Notice: Subject to any disclaimer, the term of this patent is extended or adjusted under 35 U.S.C. 154(b) by 311 days.

(21) Appl. No.: 09/917,025

(22) Filed: Jul. 27, 2001

(65) Prior Publication Data
US 2003/0020829 A1    Jan. 30, 2003

(51) Int. Cl.
*H04N 5/232* (2006.01)

(52) U.S. Cl. ................................ 348/335; 348/375

(58) Field of Classification Search ............. 348/81, 348/375, 124, 208.1, 340, 36, 740, 37; 398/36, 398/106, 112
See application file for complete search history.

(56) References Cited

U.S. PATENT DOCUMENTS

| | | | | |
|---|---|---|---|---|
| 3,258,595 A | * | 6/1966 | Galante | 398/112 |
| 4,794,575 A | * | 12/1988 | Miller | 367/134 |
| 5,018,852 A | * | 5/1991 | Cheng et al. | 356/28.5 |
| 5,060,206 A | * | 10/1991 | DeMetz, Sr. | 367/136 |
| 5,543,972 A | * | 8/1996 | Kamewada | 359/834 |
| 5,579,285 A | * | 11/1996 | Hubert | 367/133 |
| 5,661,294 A | * | 8/1997 | Buchmann et al. | 250/223 B |
| 5,690,041 A | * | 11/1997 | Hillenbrand et al. | 114/21.2 |
| 5,973,733 A | * | 10/1999 | Gove | 348/208.13 |
| 6,525,762 B1 | * | 2/2003 | Mileski et al. | 348/81 |
| 6,532,037 B1 | * | 3/2003 | Shimura | 348/36 |
| 2002/0006000 A1 | * | 1/2002 | Kumata et al. | 359/853 |
| 2003/0007795 A1 | * | 1/2003 | Grober | 396/55 |

FOREIGN PATENT DOCUMENTS

JP    06141211 A  *  5/1994
JP    11298884 A  *  10/1999

* cited by examiner

*Primary Examiner*—Tuan Ho
(74) *Attorney, Agent, or Firm*—Iandiorio & Teska

(57) ABSTRACT

A photonic buoy including a lengthy hull with a ballast portion which resides below the waterline and a top portion which is disposed above the waterline; an optical bench at the top portion of the hull configured to provide a panoramic view of the horizon; and a transmission cable extending from the optical bench for transmitting video signals to a remote location.

9 Claims, 4 Drawing Sheets

PHOTONIC BUOY

FIELD OF THE INVENTION

This invention relates to a system for detecting or monitoring the presence of objects on the water to, for example, ensure that a submarine does not collide with surface craft and/or is not detected by hostile forces when the submarine surfaces.

BACKGROUND OF THE INVENTION

The transition of a submarine from deep under the ocean surface to periscope depth can place both the submarine and surface craft at risk. As evident by the incidents involving the U.S.S. Greenville and the U.S.S. Jacksonville submarines, the present procedures using passive sonar and the submarine's periscope do not always avoid submarine/surface craft collisions.

The existing practice on board U.S. submarines preparing to surface is to check for existing contacts using passive sonar. If any contacts are determined to be near the submarine and present a possibility of counter-detection or collision, no excursion is made to periscope depth. If no contacts present a risk, the submarine then proceeds to periscope depth. The primary risk to the submarine coming to periscope depth in a littoral environment is a quiet surface contact such as a fishing vessel or pleasure craft. When surface contacts are not detectable due to the silence of the contact (e.g., a sailboat) or due to water conditions (e.g., a surface layer), the submarine's first detection of a contact can very well be the moment the periscope breaks the water surface.

In the prior art, one attempt was made to produce a camera buoy launched from the submarine's three inch countermeasure launcher. The single unit was built by General Dynamics as an experimental addition to the original non-penetrating mast (NPP) digital periscope program. The system as envisioned by General Dynamics used an expendable three inch diameter buoy with a gyro-stabilized optic assembly. This attempt was unsuccessful, however, because of the very low height-of-eye of the buoy due to the weight of the mechanical image stabilization subsystem and the limitation of the package to the dimensions of an unmodified three inch launcher. Also, the very short copper wire tether used to transmit the video signal prevented full deployment of this system.

Also in the prior art, attempts were made to place a camera on a submarine aimed up at the ocean surface. This system, however, does not work when the depth of the submarine is beyond a certain limit, when the water is murky, when it is cloudy or dark, or when large waves are present on the ocean's surface.

SUMMARY OF THE INVENTION

It is therefore an object of this invention to provide a deployable photonic buoy.

It is a further object of this invention to provide such a photonic buoy which prevents detection of a submarine by enemy ships and prevents submarine/surface craft collisions.

It is a further object of this invention to provide such a photonic buoy which can be used in conjunction with non-submarine environments, for example, surveillance, drug interdiction, offshore commercial venture monitoring proximate pearl farms, oil platforms, and the like, and private waterfront surveillance and monitoring applications.

It is a further object of this invention to provide such a photonic buoy which does not require and thus does not suffer from the disadvantages associated with a gyro-stabilized optics assembly.

It is a further object of this invention to provide such a photonic buoy which provides a panoramic view of the horizon.

It is a further object of this invention to provide such a photonic buoy system which provides a stable composite image of the horizon.

It is a further object of this invention to provide a photonic buoy system with a very long transmission cable tether to allow the submarine to maneuver freely even when the photonic buoy is deployed.

It is a further object of this invention to provide a photonic buoy which is deployable even when the submarine is fairly deep below the ocean surface.

It is a further object of this invention to provide a photonic buoy which provides a discernable panoramic view of the horizon even if the ocean water is murky, when it is cloudy or dark, and even when large waves are present on the ocean surface.

This invention results from the realization that a stable composite image representing a panoramic view of the horizon can be provided without the use of an expensive gyro-stabilized optics assembly by providing an optical bench at the top portion of a lengthy buoy configured to be launched from a standard launcher and including ballast which keeps the optical bench above the waterline. The optical bench includes a vertically oriented imager aimed at a panoramic optical element such as a conical mirror or a conical prism. The buoy rotates, bobs, and moves to and from in the water but the remote workstation located on board the submarine or elsewhere is configured to compensate for all motion artifacts, to capture still frame images, and to stitch together a stable composite image. The bearing of any detected watercraft is provided by a flux gate compass inside the buoy.

This invention features a photonic buoy comprising a lengthy hull including a ballast portion which resides below the waterline and a top portion which is disposed above the waterline; an optical bench at the top portion of the hull configured to provide a panoramic view of the horizon; and a transmission cable extending from the optical bench for transmitting video signals to a remote location.

In one example, the optical bench includes a conical mirror inside the top portion of the hull surrounded by a transparent wall and a vertically oriented imager aimed at the conical mirror. In another example, the optical bench includes a conical prism sealed with respect to the top of the hull and a vertically oriented imager in the hull aimed at the conical prism. In either case, the imager is typically a CCD camera and/or an infrared camera.

Typically, the photonic buoy further includes a sensor in the hull which detects the attitude of the buoy. Also, the transmission cable typically includes optical fibers and there is a converter within the buoy responsive to the imager to convert image data into optical data for transmission over the optical fibers of the transmission cable.

The photonic buoy may include a self scuttling plug therein. The hull of the photonic buoy preferably has a diameter compatible with a launcher of a submarine. The ballast portion includes a weight disposed therein and also a spool of transmission cable.

The system of this invention features a buoy with a lengthy hull including a ballast portion which resides below the waterline and a top portion which is disposed above the waterline; and an optical bench at the top portion of the hull configured to provide a panoramic view of the horizon. The system for this includes a workstation remote from the hull responsive to the optical bench and including a display and image stabilization circuitry for presenting a composite image of the horizon on the display; and a transmission cable interconnecting the buoy and the workstation.

In one embodiment, the ballast portion of the hull includes a first spool of transmission cable, and the workstation is located on board a submarine which includes a second spool of the transmission cable. Typically, the image stabilization circuitry includes frame rate image processing software and hardware.

The photonic buoy of this system typically includes a vertically oriented imager in the hull and an optical element at the top portion of the hull configured to direct a panoramic view of the horizon to the vertically oriented imager. In one example, the optical element is a conical mirror. In another example, the optical element is a conical prism.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
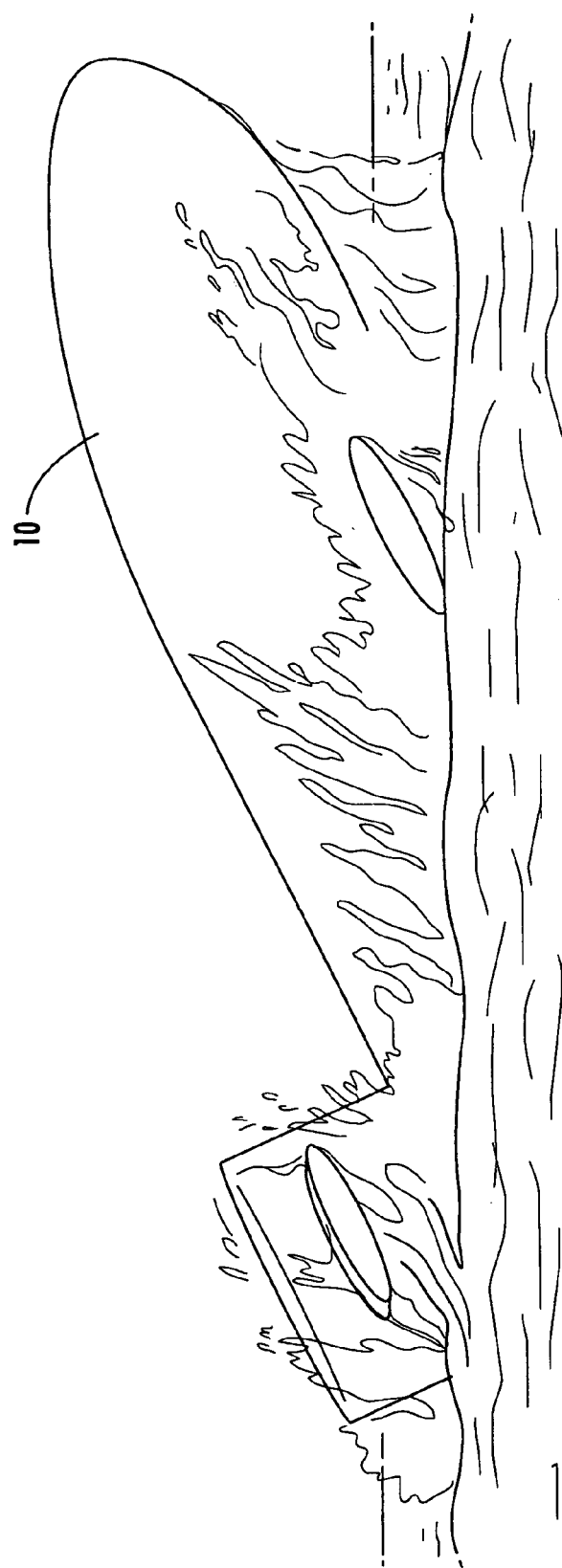
FIG. 1 is a schematic view depicting a submarine breaking the ocean surface.

As shown in FIG. 1, when submarine 10 surfaces, it can a be fairly violent event subjecting submarine 10 and any surface craft proximate submarine 10 to damage or, worse, injury or death to the occupants of submarine 10 and/or the surface craft.

In the Background section above, the prior art attempts to prevent such collisions and/or to prevent detection of submarine 10 have largely failed.

Figure 2:
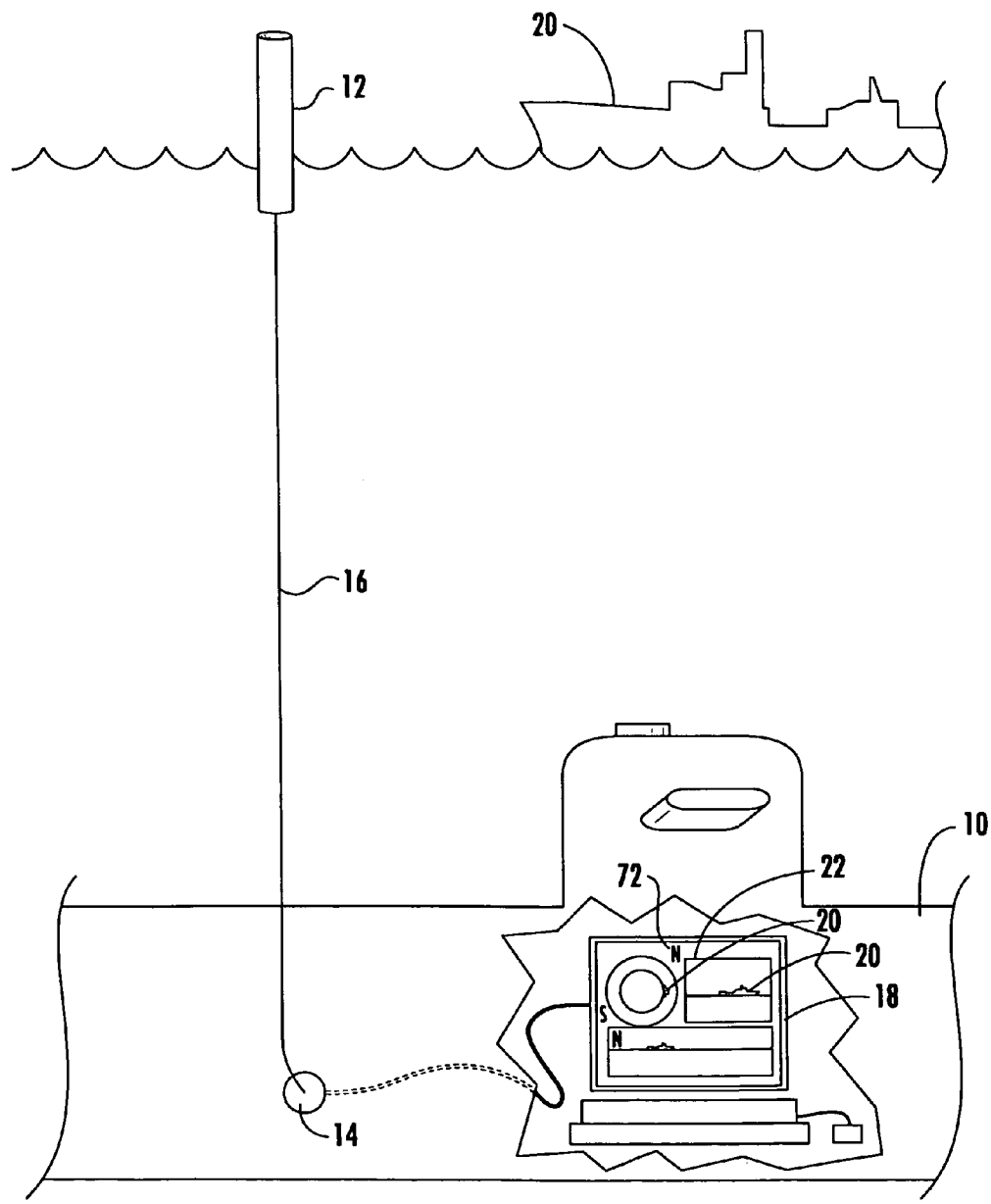
FIG. 2 is a schematic diagram showing the primary components associated with the photonic buoy system of the subject invention.

In this invention, long before submarine 10, FIG. 2 reaches periscope depth, 4-6' long buoy 12 is deployed from launcher 14 of submarine 10, typically a three inch counter measure launcher usually used to launch flares and expendable Bathythermographs (XBTs). Submarine 10 may be an attack class or Trident class submarine. Buoy 12 is tethered to submarine 10 via cable 16 discussed infra which extends through the breech door of the launcher and interconnects buoy 12 with workstation 18 on board submarine 10.

Deployment of expendable photonic buoy 12 begins with the loading of the buoy in the submarine's existing countermeasure launcher 14. The fiber-optic cable 16 used to connect the buoy to imaging workstation 18 is fed through the breech door of the launcher and connected to imaging workstation 18. Following the launch, expendable photonic buoy 12 floats to the surface while paying out the fiber-optic cable. Once the buoy has reached the surface, panoramic imagery (including surface ship 20) captured by the camera in buoy 12 is transmitted over the fiber-optic cable to imaging workstation 18. Using imaging workstation 18, the operator has the ability to observe the video imagery, capture still-frame images and to mark contacts as shown at 22. Orientation of the video imagery relative to North is determined using an on-board flux gate compass. While the buoy is in use, submarine 10 is free to maneuver while paying out cable from its own spool of fiber-optic cable remaining in launcher 14. Disposal of photonic buoy 12 is accomplished by allowing the buoy to scuttle itself at the end of an operator selectable duration through the use of a dissolvable plug.

Figure 3:
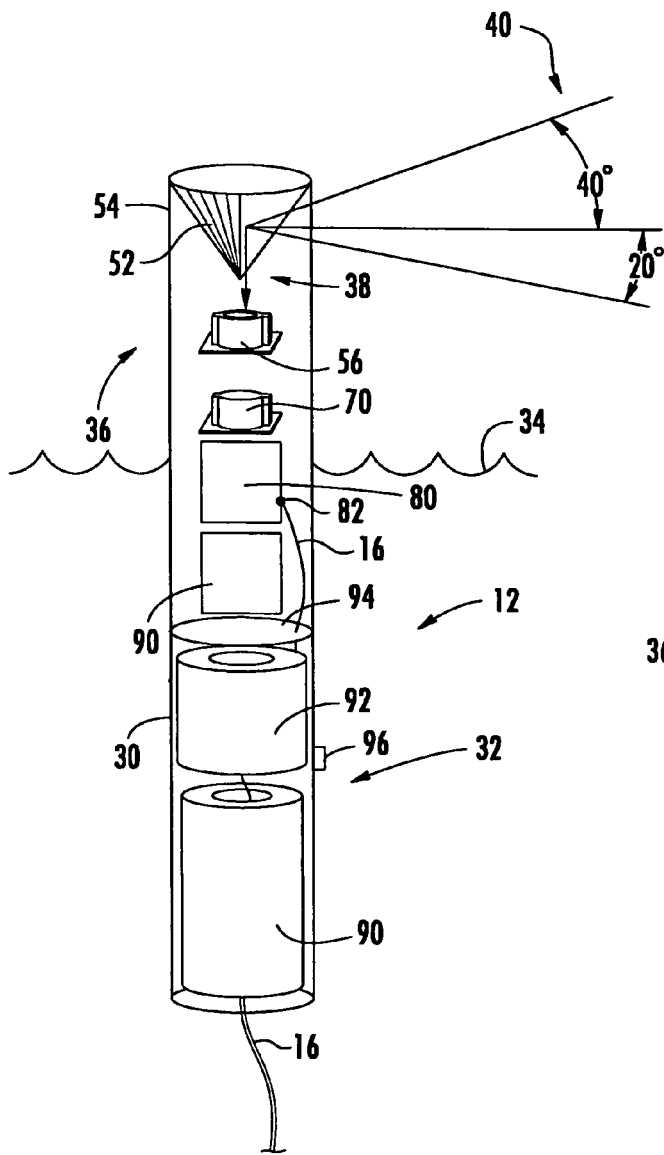
FIG. 3 is a schematic view showing the primary components associated with the photonic buoy shown in FIG. 2 according to one embodiment of the subject invention.

Accordingly, photonic buoy 12, FIG. 3 includes lengthy cylindrical 4' long hull 30 made of aluminum, for example, which can withstand pressures of 200 psi at a 200 ft launch depth. Hull 30 is divided into two sections or portions: ballast portion 32 which resides below waterline 34 and top portion 36 which is disposed 1½-2' above waterline 34. Buoy 12 includes optical bench 38 at top portion 36 configured to provide a panoramic view of the horizon as shown at 40, typically 40° above and 20° below horizontal as shown. Transmission cable 16 transmits video signals to a remote location such as workstation 18, FIG. 2 on board submarine 10. In other embodiments, however, buoy 12, FIG. 3 can be anchored and used for surveillance purposes and remote communications accomplished by including a transmitter or the like on buoy 12. Applications include surveillance of sensitive maritime environments, (e.g., coral reefs, endangered species habitats, and the like), drug interdiction, surveillance of offshore commercial ventures such as pearl farms and oil platforms, and surveillance of private waterfront properties. The photonic buoy may include other types of known sensors such as acoustic and radio frequency sensors, may include a satellite up-link to provide a communications channel to workstation 18, and can be programmed to provide continuous photographic surveillance to thereby provide photographic evidence for identification and prosecution purposes.

Figure 4:
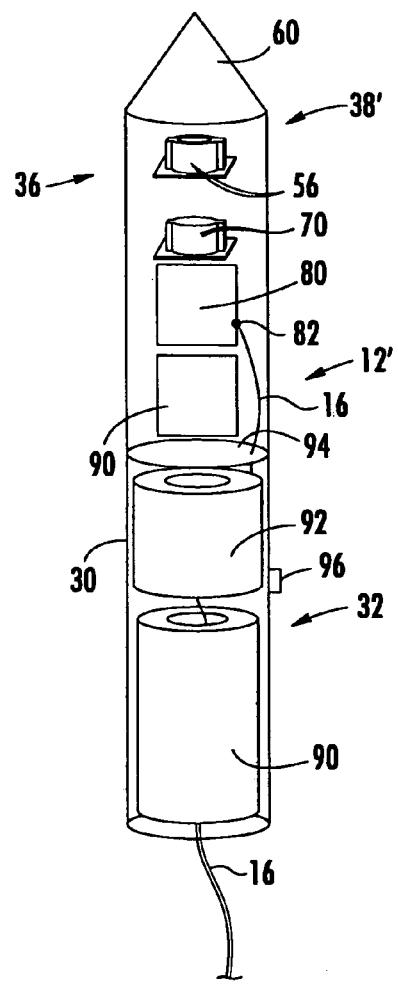
FIG. 4 is a schematic view showing the primary components associated with the photonic buoy shown in FIG. 2 in accordance with another embodiment of the subject invention.

Optical bench 38, FIG. 3 and 38', FIG. 4 include an optical element configured to direct a panoramic view of the horizon to an imager. In one embodiment, optical bench 38, FIG. 3 includes 45° conical mirror 52 inside top portion 36 of buoy 12 surrounded by and sealed with respect transparent glass cylinder wall 54. Conical mirror 52 may be 10 mm in diameter and aluminum coated ⅛ wave. Vertically oriented imager 56 (e.g., a single board color video CCD camera, NTSC format 768×494 resolution) is aimed at conical mirror 52. In some embodiments, imager 56 may be an infrared camera for nighttime surveillance or two cameras may be used, a CCD video camera and also an infrared camera.

In another embodiment, optical bench 38', FIG. 4 of buoy 12' includes conical prism 60 sealed with respect to the top of hull 30' as shown and thus a transparent cylinder portion is not required in the hull of buoy 12'.

In both embodiments, the other primary components associated with the photonic buoy of this invention are the same or similar and therefore FIGS. 3 and 4 use the same reference numbers.

Sensor 70 in hull 30, typically a flux gate compass, detects the attitude of buoy 12 to provide orientation information of the video imagery relative to North to workstation 18, FIG. 2 via transmission cable 14 as shown at 72. In the preferred embodiment, cable 14 includes optical fibers and thus buoy 12, FIGS. 3 and 4 includes converter 80 which converts image data captured by camera 56 to optical data which is transmitted over the optical fibers in cable 14 connected to converter 80 as shown at 82. In one example, converter 80 is a NTSC to fiber encoder/decoder available from the Blackbox Corporation under the trade name "FiberPath".

Power source 90 (e.g., a 12 volt battery) provides power for converter 82, compass 70, and camera 56.

Ballast portion 32 of buoy 12 typically includes weight 90 and cable spool 92 disposed below bulkhead 94. Self scuttling plug 96 dissolves or erodes after a predetermined time period in water and thus hull portion 32 fills with water and buoy 12 sinks.

Figure 5:
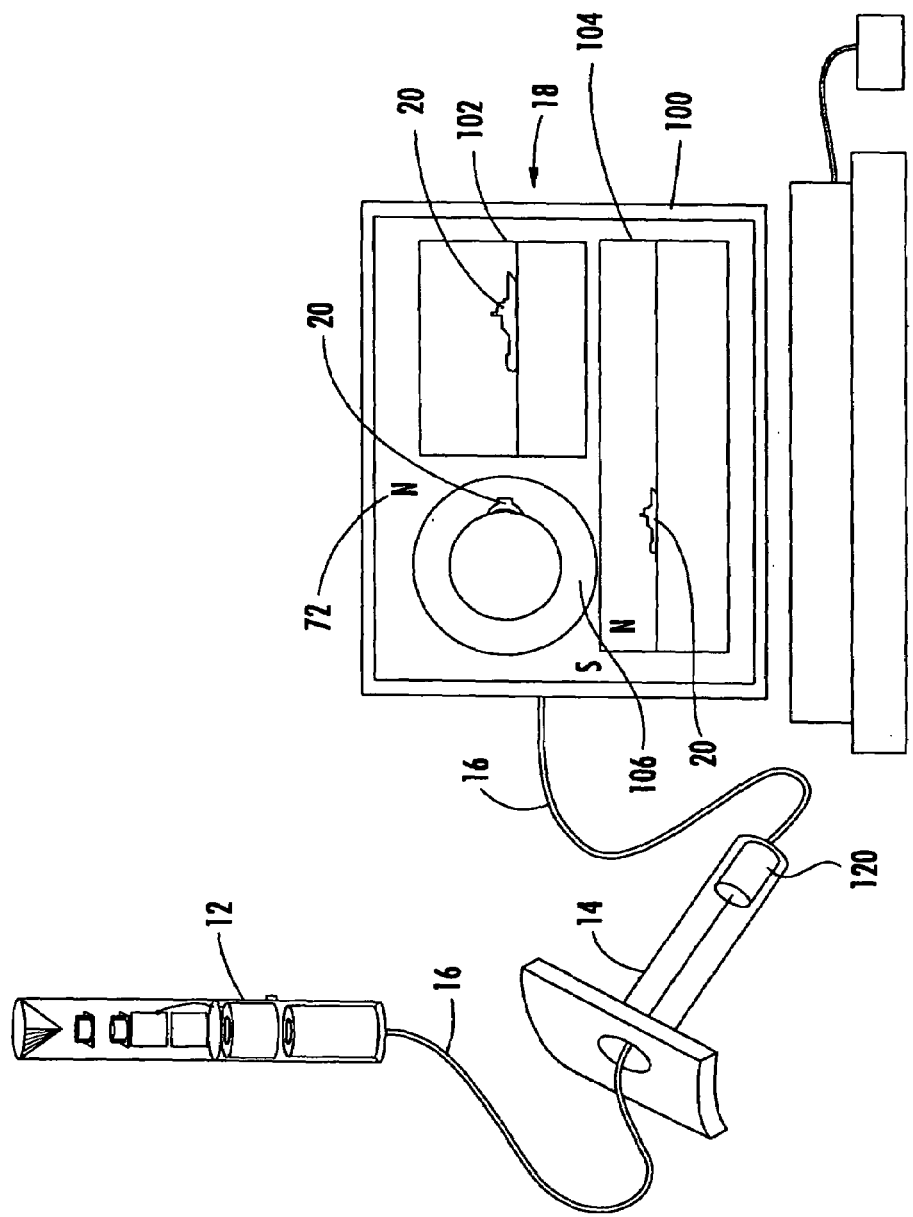
FIG. 5 is another schematic view showing the primary components associated with the photonic buoy system of the subject invention and, in particular, showing the different motion artifact compensated images provided by the system of the subject invention.

Workstation station 18, FIG. 5 includes display 100 and image stabilization circuitry for presenting one or more composite images 102, 104, and 106 of the horizon as imaged by camera 56, FIGS. 3-4 through a conical mirror 52, FIG. 3 or conical prism 60, FIG. 4 or any other suitable optical element configured to direct a panoramic view of the horizon to camera 56. The image stabilization circuitry typically includes frame rate image processing software and hardware such as the DataCube (Danvers, Mass.) MAX PCI board set (INTEL/PCI) which supports frame capture and frame-rate image processing (8×8 convolution, frame averaging and LUT operations). In each image, ship 20 (see FIG. 2) is shown in a stable fashion even when waves are present on the ocean surface due to the use of pixel mosaic software operating on work station 18 which stitches together a stable composite image. Compensation of buoy motion artifacts due to waves is also accomplished by capturing still frame images while the buoy is located at the peak of a wave—a feature which further boosts the height of optical bench 38, FIGS. 3-4 above the waterline to increase to observable range.

As such, buoy 12 does not typically include any complex, expensive, and, in the prior art, ineffective gyro-stabilization optics assemblies. Instead, workstation 18, FIG. 5 overcomes the effect of wave motion on the video signal output by the camera on the buoy.

Moreover, the use of flux gate compass 70, FIGS. 3-4 provides orientation information to workstation 18, FIG. 5 which determines each contact's bearing measured in the pixel space.

Also shown in FIG. 5 is spool 120 located in launcher 14 for paying out transmission cable 16 as the submarine moves after launching the buoy. Although launcher 14 has been described as a standard three inch launcher and thus buoy 12 is typically three inches in diameter or less and 4' long, other launchers can be used and/or launcher 14 can be fitted with a breech door adapter to allow for a longer, 6' long buoy. Spool 92, FIGS. 3-4 on buoy 12 typically contains over 200' of transmission cable while spool 120, FIG. 5 contains up to 1½ miles of transmission cable.

Compared to the prior art attempt to produce a camera type buoy, no gyro-stabilization optics are required on board buoy 12, FIGS. 3-4 and, as such, optical bench 38, FIGS. 3-4 is higher above the waterline to capture a panoramic view of the horizon and image stabilization is provided by workstation 18, FIG. 5. By using optical communications, transmission cable 16 can be very long as compared to the short copper wire tether proposed in the prior art.

The use of conical mirror 52, FIG. 3 (or prism 60, FIG. 4) provides a panoramic view of the horizon without the use of moving components. The use of imaging workstation 18, FIG. 3 allows the viewing of the resulting imagery either in raw form (as a toroid) showing the whole of the horizon with "up" at the circumference of the plot as shown at 106 or as processed to present the user with a vertically oriented image to emulate the imagery displayed by existing submarine periscopes as shown at 102 and 104. The use of camera 56, FIGS. 3-4 primarily as an image capture device for still frame imagery uses wave motion as an advantage in gaining height-of-eye (the height of optical bench 38) above the waterline. Frame rate image processing supported by the reuse of previously developed photonics mast workstation software advantageously resides on workstation 18.

Once buoy 12 is on the surface, roughly 2-3 feet of the buoy will be exposed. This mimics the typical exposure for existing periscopes when used for an initial safety sweep. The range of detection for trawlers (having a 65 foot mast head height) is in the range of 5 nautical miles. Large surface contacts having a 100 foot mast head height are detectable out to 10 nautical miles.

In this way, photonic buoy 12, FIGS. 2-4 prevents collisions and also the detection of a submarine by enemy ships. Gyro-stabilized optics assemblies are not required for image stabilization and the buoy system still provides the user with an image stabilized panoramic view of the horizon. The long transmission cable tether allows the submarine to maneuver freely even when the photonic buoy is deployed and allows the photonic buoy to be deployed even when the submarine is fairly deep below the ocean surface.

A stable composite image representing a panoramic view of the horizon is provided without the use of an expensive gyro-stabilized optics assembly. Instead, the optical bench at the top portion of the buoy includes a vertically oriented imager aimed at a panoramic optical element such as a conical mirror or a conical prism. The buoy rotates, bobs, and moves to and from in the waves but the remote workstation located on board the submarine or elsewhere is configured to compensate for all motion artifacts, to capture still frame images, and to stitch together a stable composite image. The bearing of any detected watercraft is provided by the flux gate compass on the buoy.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A photonic buoy comprising:
    a lengthy hull divided into a ballast portion which resides below the water line and a top portion disposed above the water line;
    a mass in the ballast portion; and
    an optical bench in the top portion including:
        an optical device configured to provide a panoramic view of the horizon, and
        a fixed vertically oriented imager aimed at the optical device.

2. The photonic buoy of claim 1 in which the optical device is a conical mirror inside the top portion of the lengthy hull surrounded by a transparent wall.

3. The photonic buoy of claim 1 in which the optical device is a conical prism sealed with respect to the top of the hull.

4. The photonic buoy of claim 1 in which the imager includes a CCD camera.

5. The photonic buoy of claim 1 in which the imager includes an infrared camera.

6. The photonic buoy of claim 1 further including a sensor in the top portion of the hull for detecting the attitude of the buoy.

7. The photonic buoy of claim 1 further including a transmission cable extending from the optical bench for transmitting video signals to a remote location.

8. The photonic buoy of claim 1 in which the hull includes a self-scuttling plug therein.

9. The photonic buoy of claim 1 in which the hull has a diameter compatible with a launcher of a submarine.

* * * * *